(12) United States Patent
Scott

(10) Patent No.: US 8,474,411 B2
(45) Date of Patent: Jul. 2, 2013

(54) WILD ANIMAL DETERRENT DEVICE AND METHOD

(76) Inventor: Tim L. Scott, Springfield, KY (US)

( * ) Notice: Subject to any disclaimer, the term of this patent is extended or adjusted under 35 U.S.C. 154(b) by 103 days.

(21) Appl. No.: 13/189,741

(22) Filed: Jul. 25, 2011

(65) Prior Publication Data

US 2012/0017845 A1    Jan. 26, 2012

Related U.S. Application Data

(60) Provisional application No. 61/367,522, filed on Jul. 26, 2010.

(51) Int. Cl.
*A01K 29/00*    (2006.01)

(52) U.S. Cl.
USPC .................................... 119/712; 340/573.2

(58) Field of Classification Search
USPC ....... 119/712, 713, 719, 721, 908; 340/573.1, 340/573.2, 573.3; 43/132.1, 113
See application file for complete search history.

(56) References Cited

U.S. PATENT DOCUMENTS

| | | | | |
|---|---|---|---|---|
| 3,898,639 A * | 8/1975 | Muncheryan | ................. | 340/529 |
| 4,097,607 A | 6/1978 | Larson | | |
| 5,299,971 A * | 4/1994 | Hart | ............................... | 446/484 |
| 5,343,652 A | 9/1994 | Johnson | | |
| 5,549,220 A * | 8/1996 | Whalen | .............................. | 222/1 |
| 5,685,636 A * | 11/1997 | German | ........................ | 362/259 |
| 5,892,446 A * | 4/1999 | Reich | .......................... | 340/573.1 |
| 5,969,593 A * | 10/1999 | Will | .......................... | 340/384.2 |
| 5,986,551 A * | 11/1999 | Pueyo et al. | ................ | 340/573.1 |
| 6,007,218 A * | 12/1999 | German et al. | ............... | 362/259 |
| 6,069,748 A * | 5/2000 | Bietry | ........................... | 359/719 |
| 6,250,255 B1 * | 6/2001 | Lenhardt et al. | .............. | 119/713 |
| 6,288,644 B1 * | 9/2001 | Mathews et al. | .............. | 340/555 |
| 6,309,090 B1 * | 10/2001 | Tukin | ............................. | 362/276 |
| 6,359,835 B1 * | 3/2002 | Gayl | ............................. | 367/139 |
| 6,407,670 B1 * | 6/2002 | Dysarsz et al. | ............ | 340/573.2 |
| 6,575,597 B1 * | 6/2003 | Cramer et al. | ................ | 362/259 |
| 6,681,714 B1 * | 1/2004 | Johnson | ....................... | 116/22 A |
| 6,793,364 B2 * | 9/2004 | Cramer et al. | ................ | 362/112 |
| 7,040,780 B2 * | 5/2006 | Diehl | ............................. | 362/259 |
| 7,232,240 B2 | 6/2007 | Kosnik et al. | | |
| 7,239,655 B2 * | 7/2007 | Casazza | ........................... | 372/36 |
| 7,699,018 B2 * | 4/2010 | Wells | ........................... | 116/22 A |
| 7,794,102 B2 * | 9/2010 | Shemwell et al. | ............ | 362/109 |
| 2006/0256559 A1 * | 11/2006 | Bitar | ............................... | 362/259 |
| 2007/0188334 A1 * | 8/2007 | Spiegel | ....................... | 340/573.3 |
| 2010/0172136 A1 | 7/2010 | Williamson et al. | | |

* cited by examiner

*Primary Examiner* — Yvonne Abbott
(74) *Attorney, Agent, or Firm* — Michael Coblenz

(57) ABSTRACT

The invention is an animal deterrent device and method of using the device. The device consists of a dazzler laser that produces eye irritation in an animal which results in the animal turning away from the user of the device. The device incorporates a diverging lens such that the dazzler laser produces a beam with a wide spread that makes it is easy to shine the beam on a potentially dangerous animal, but where the light is of sufficient intensity to irritate the animal's eyes.

18 Claims, 10 Drawing Sheets

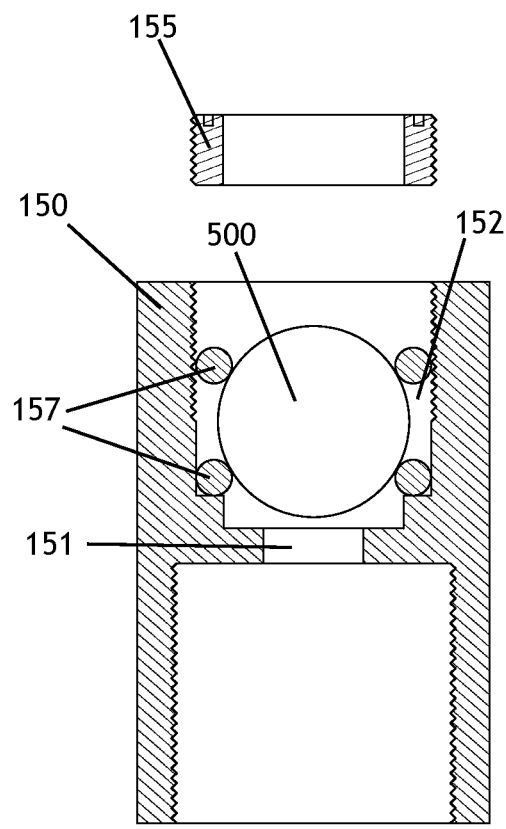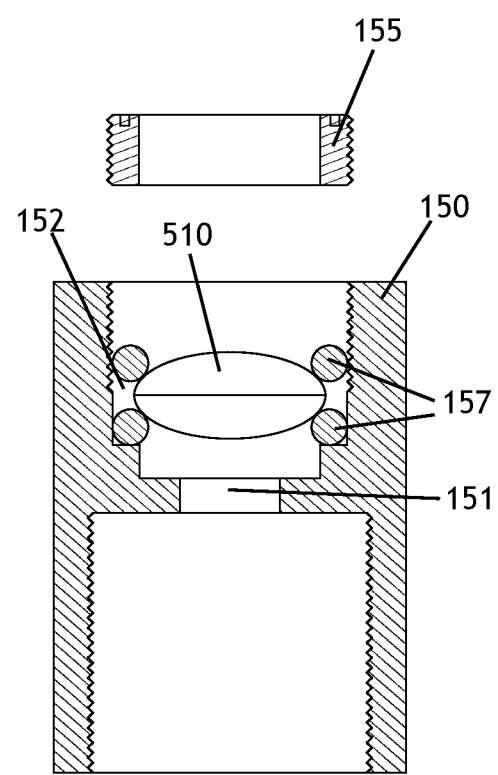
*FIG. 10*  *FIG. 11*

WILD ANIMAL DETERRENT DEVICE AND METHOD

CROSS REFERENCE TO RELATED APPLICATIONS

This application claims priority to U.S. provisional application Ser. No. 61/367,522 filed on Jul. 26, 2010.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to a laser light producing device for deterring attacks by wild animals, and a method of using the device to prevent wild animal attacks.

2. Description of the Related Art

There are only a handful of non-lethal animal deterrent devices, primarily pepper spray or synthetic sprays. An example of a chemical based deterrent is disclosed in U.S. Pat. No. 4,097,607 to Larson, which is drawn to a capsaicin based chemical compound to deter animals from entering specified areas. There are also a number of devices that attempt to use loud noises to deter animals, see for examples U.S. Pat. No. 5,892,446 to Reich, which is a mounted device to deter animals from entering a fixed location.

There are a wide variety of laser "dazzler" technology patents, which use high intensity laser light to temporarily blind a target, or cause eye irritation that causes the target to turn away from the light source. The terms "dazzle," "dazzling," and "dazzled" as used herein refers to the use of laser light to cause eye irritation. The existing dazzler inventions are primarily used in military or crowd control situations. Virtually all dazzler technology is designed to increase the intensity and or distance of the laser light to be able to "dazzle" a potential human target at a long distance from the light source. Examples include U.S. Pat. No. 7,040,780 to Diehl; U.S. Pat. No. 7,232,240 to Kosnik et al.; and U.S. Pat. No. 7,239,655 to Casazza. These devices create a high intensity laser light that causes eye irritation, or even damage, and prevents a person from looking directly at the light source. In military use this can prevent an enemy from aiming a weapon, and in non-military use it can deter people from approaching the light source. The animal deterrent described herein uses analogous technology to prevent an animal from approaching or attacking the user of the device.

Laser-based dazzling technology has existed for several decades. Virtually all development has been in the field of military countermeasures, and designed with the intent of disabling an enemy so that he cannot effectively aim a weapon at the user. Such devices are expensive, usually weapon-mounted apparatus designed to cast a narrow, intense beam of light in the direction of a line of sight for a weapon, such as a rifle or cannon. Laser dazzlers have been fitted to rifles, tanks and armored personnel carriers, employing a narrow beam divergence. There have, also, been experiments with crowd control. The vast majority of improvements on this technology has been directed at increasing the intensity of the beam to allow its use at increased distances.

BACKGROUND OF THE INVENTION

Large animals, such as bear, elk, moose, buffalo, cattle, wild cats and dogs, can harm humans through predatory attack, defense of territory, young or food, and by offensive actions attributable to numerous other motivations. In the past humans typically protected themselves with a firearm, but such action is now tightly restricted or banned, and in many places is considered unacceptable. People need the ability to quickly and effectively defend themselves by non-lethal means, using methods that are effective, yet do not permanently harm an offending animal in recognition of practical, legal, economic and ethical considerations. An effective, general-purpose deterrent should be easy to carry, quick to access, simple to use, repeatable, yet inexpensive. Such a deterrent would enable humans and other animals to co-exist in habitats that otherwise might become human-occupied only. The remainder of this discussion will refer to bears as the example target animal, because this species generates the greatest need for deterrence. The device, however, will work equally well with any aggressive animal.

Only one generally-accepted, non-lethal class of bear attack deterrent currently exists. These are chemical-based aerosol sprays that generally use a chili pepper derived oleoresin capsicum: brand names include Counter Assault, Frontiersman, Guard Alaska, Mace and UDAP. There are several problems associated with this type of deterrent. The maximum range of an aerosol spray is 25 to 35 feet under ideal conditions. The spray usually is in a narrowly confined stream so that it can reach these distances. Wind can impair properly aiming the spray and it can also shorten the useful range. Wind can also blow the chemical into the user's face, disabling the user instead of the animal. Total operating duration of conventional aerosol sprays is typically 6 to 9 seconds before the container is exhausted. This means that the spray can be used only once. And finally the deterrent does not work on all animals.

Many locations around the world prohibit visitors into wilderness habitats from carrying lethal deterrents or deterrents that can cause permanent injury to an offending animal. Other practical considerations exist for areas that do allow carriage of lethal deterrents, such as firearms. Many people cannot afford or do not know how to use firearms. Misuse of firearms can wound and enrage an animal, transforming it from a potential threat into a deadly one. The potential for accidents with deadly weapons also exist, where those who would protect themselves instead find themselves the victim of their own defense. For these reasons, an economical, simple to use, one-hand operable, non-injurious, all-weather deterrent device with a long operational duty cycle is needed.

SUMMARY OF THE INVENTION

The present invention, referred to herein as the bear dazzler, is drawn to an inexpensive, hand held laser device that creates an eye irritant that will force an animal to turn away from the user, and will therefore deter an animal attack. The laser device will include a diverging lens to create a broad beam, of between 5 and 30 degrees, so that the user can point the device in the general direction of the animal and will not have to aim the beam precisely.

The bear dazzler is about the size of a small conventional flashlight and so is easy to carry. It uses conventional, well known laser technology, so is relatively inexpensive. The beam divergence allows it to be pointed in the general direction of an animal and eliminates the need to be precisely aimed. It is also unaffected by the wind. Finally, with conventional batteries and conventional laser technology the bear dazzler has a typical operable life of an hour and a half. The bear dazzler is designed for easy storage and removal, and easy use. The activation switch is located on the side of the housing so that it can be easily activated. The beam spread means that the user does not need to precisely aim the device. This is a benefit since it may be difficult to properly aim during an animal encounter due to relative movement of the user and the animal or due to the user's anxiety.

BRIEF DESCRIPTION OF THE DRAWINGS

FIG. 10 is a cross section detail of the ball lens within the lens assembly.

FIG. 11 is a cross section detail of the double convex lens within the lens assembly.

DETAILED DESCRIPTION OF THE INVENTION

Detailed embodiments of the present invention are disclosed herein. It is to be understood that the disclosed embodiments are merely exemplary of the invention, and that there may be a variety of other alternate embodiments. The figures are not necessarily to scale, and some features may be exaggerated or minimized to show details of particular components. Therefore, specified structural and functional details disclosed herein are not to be interpreted as limiting, but merely as a basis for teaching one skilled in the art to employ the varying embodiments of the present invention.

Figure 1:
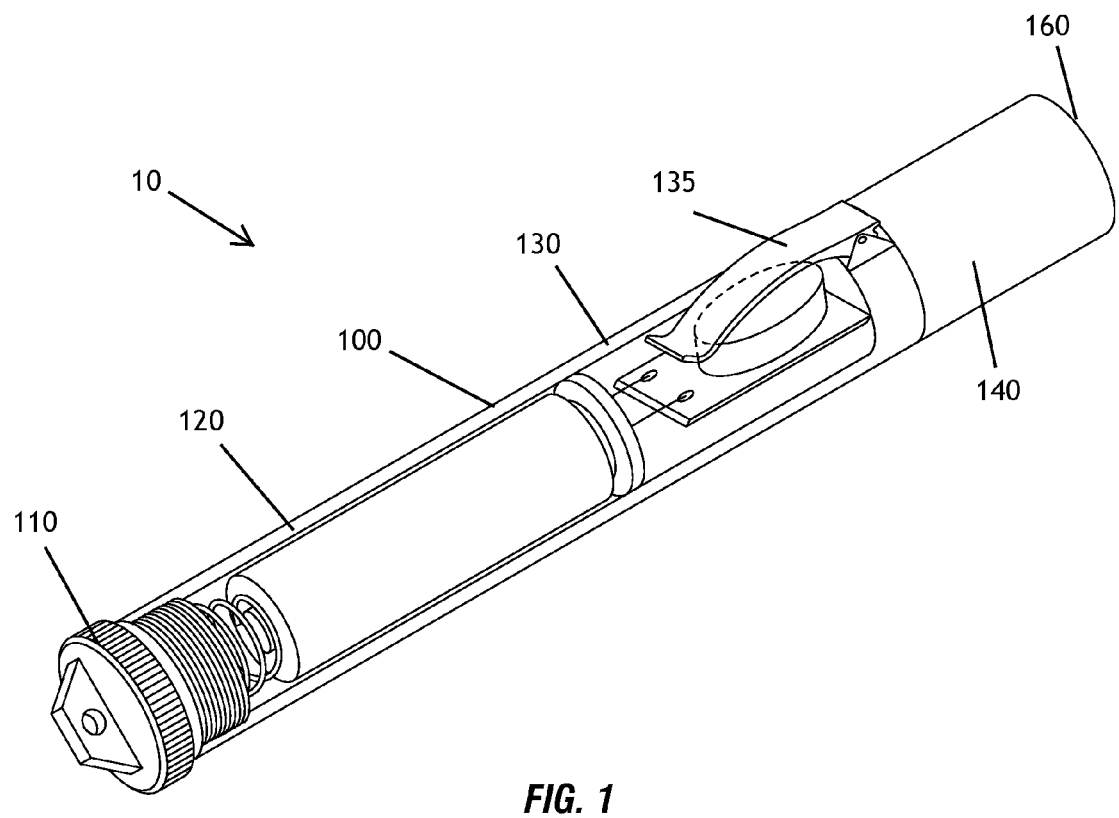
FIG. 1 is a perspective view of one embodiment of the bear dazzler.
Figure 2:
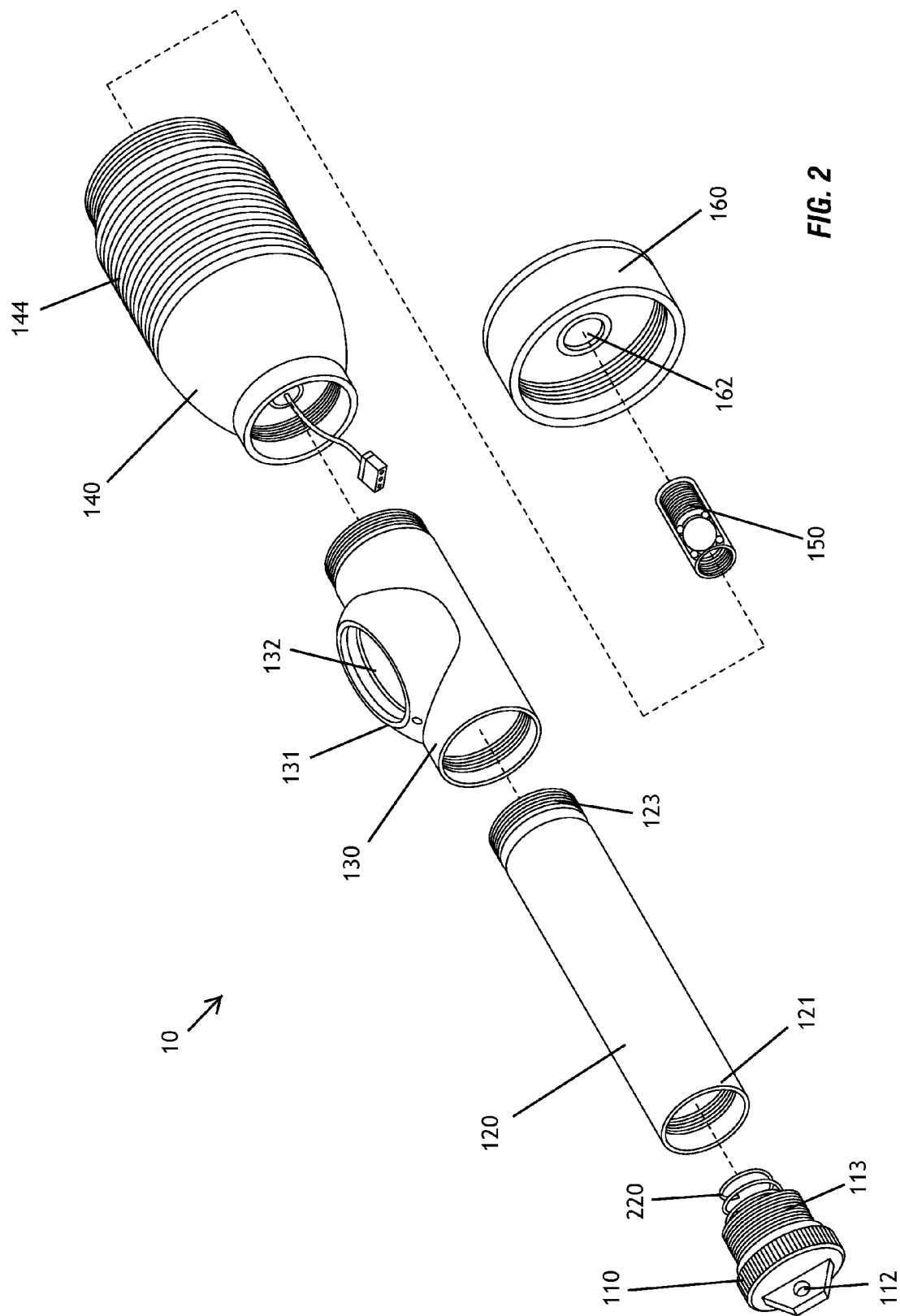
FIG. 2 is an exploded view, showing the main components of the bear dazzler.

Referring now to FIG. 1, the Bear Dazzler 10 is cylindrical and resembles a small, hand-held flashlight. It consists of a housing 100 with battery compartment 120, electronics compartment 130, nose cap 140 with a laser 400 and a lens assembly 150 mounted therein. There is an end cap 110 that closes the housing 100 at the battery compartment 120, and a front cap 160 which closes the housing 100 at the other end at the nose cap 140. The housing 100 is made from anodized aluminum, and can be produced in any desired color. In one embodiment the main components of the housing 100 (battery compartment 120, electronics compartment 130 and nose cap 140) are made from a single piece of material, but in the preferred embodiment, as shown in more detail in FIG. 2, the components are separate and attached. As seen in FIG. 2, there is an end cap 110 that attaches by means of corresponding threaded attachment to the battery compartment 120, which is threadedly attached to the electronics compartment 130, which screws onto the nose cap 140 which has an incorporated heat sink 144, and which is closed at the end by a front cap 160. In the preferred embodiment the entire housing 100 is just over six inches in length, and the battery compartment 120 and electronics component 130 is approximately three-quarters of an inch in diameter. The nose cap 140 is slightly larger in diameter. The specific dimensions of the bear dazzler 10 can vary according to the type of battery 200 used, and the thickness of the material used for the housing 100.

As shown in FIG. 2, each component is conventionally attached by a threaded connection, wherein one component has internal, or female threading and the corresponding component has external, or male threading. Each connection further includes an appropriate sized O-ring, which creates a water tight seal when the components are screwed together. The O-rings are not shown in FIG. 2, but the use of appropriate sized O-rings to create water tight seals in similar components is well known.

Figure 3:
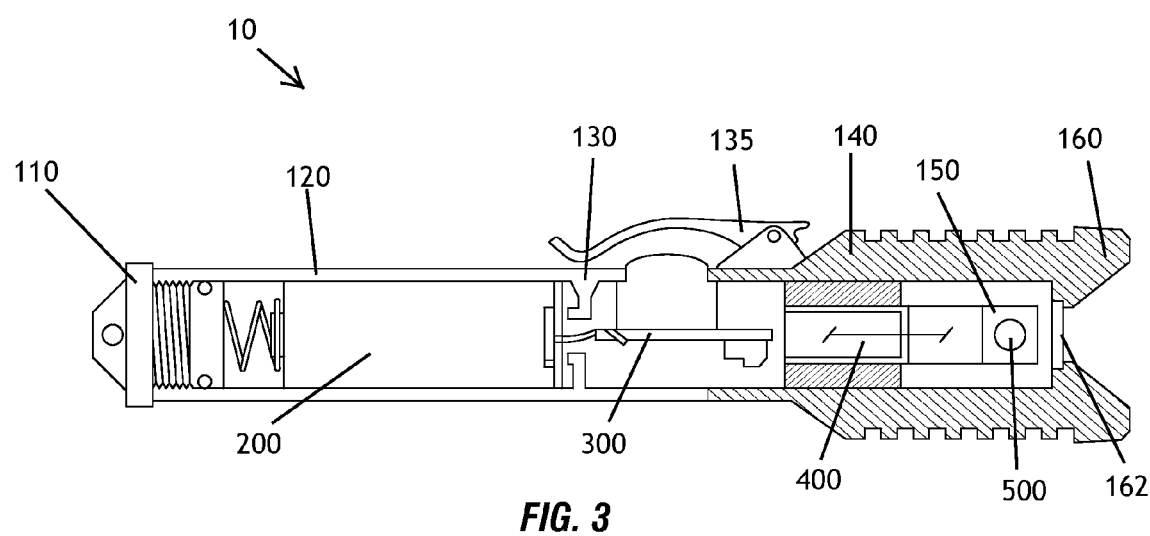
FIG. 3 is a cross section view of one embodiment of the bear dazzler showing the internal components of the bear dazzler.

As seen in the cross section of FIG. 3, there is a conventional Diode Pumped Solid State (DPSS) laser 400 within the nose cap 140. DPSS lasers are known in the art, and the laser of the bear dazzler is a conventional, off the shelf laser. Laser technology is rapidly changing: the bear dazzler works with existing laser technology, but will work with future technology as well. Recent developments in laser diodes are such that it is anticipated that a laser diode will soon be usable for the bear dazzler 10. A lens 500 within the lens assembly 150 controls the spread, or divergence angle, of the laser beam. There is a battery 200 in the battery compartment 120 which powers the laser 400, and a multi-mode electronic switch 300 within the electronics compartment 130, which controls the power supplied by the battery 200 to the laser 400. These components are electronically connected in the standard and well known manner.

Figure 4:
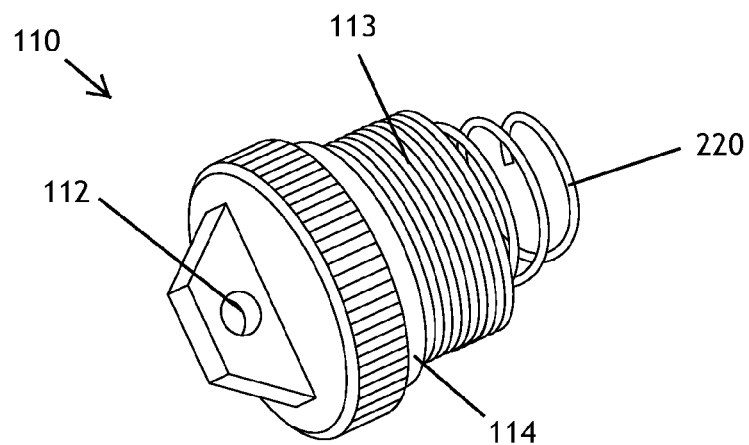
FIG. 4 is a perspective view of the end cap.
Figure 5:
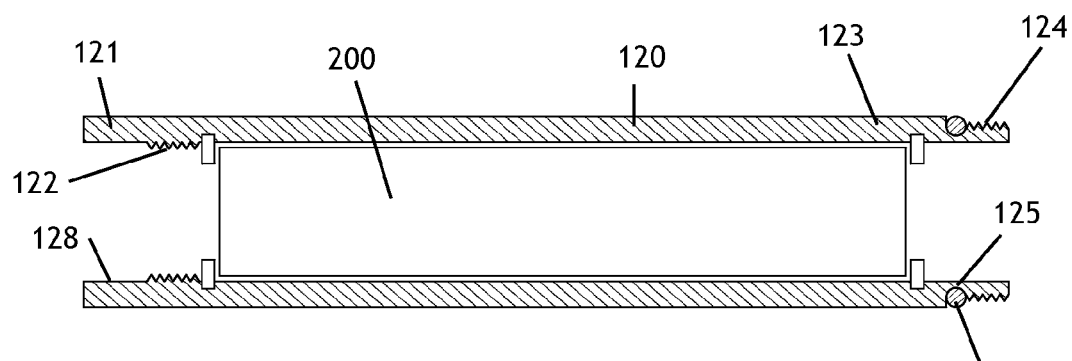
FIG. 5 is a cross section view of the battery compartment.

As depicted in FIG. 5, the battery compartment 120 is a hollow cylinder made of anodized aluminum wherein the central opening forms the battery compartment 120. The battery compartment 120 is closed on one end with a screw-threaded end cap 110 with lanyard loop 112, which is depicted in FIG. 4. The lanyard loop 112 allows the use of a lanyard to connect the bear dazzler 10 to a belt or back-pack or other outdoor hiking equipment in a manner common and well known among hikers and campers. The end cap 110 has a male threaded portion 113 that contains a groove 115 to retain an O-ring 114 to create a water tight seal when in position in the battery compartment 120. The diameter of the end cap 110 varies with the diameter of the battery compartment 120. The end cap 110 is a machined cylinder of anodized aluminum and is fitted on the interior 118 with a metal compression spring 220 which provides passive electrical bonding between the battery terminal 210 and the assembled Bear Dazzler housing 100.

The battery compartment 120 is sized to hold a battery 200 or battery pack as required by the power needs of the associated laser 400. In the most preferred embodiment the battery 200 is a single model 11865 (2,400 mAh, 3.7 VDC) rechargeable battery. In an alternate embodiment the battery 200 is a battery pack comprising six AA batteries in two 3-cell plastic battery assemblies that are sized to fit end to end within the battery compartment 120. Similar battery compartments are standard in flashlights and other small battery powered devices, and it is known to use either single batteries or multi-battery packs to power similar devices.

The end cap 110 fits into a female thread 122 at the cap end 121 of the inside wall 128 of the battery compartment 120, through a polished neck 126 which accepts the end cap O-ring 114 to provide a watertight seal. The aperture end 123 of the battery compartment 120 has a male thread 124 and retaining groove 125 with an O-ring 126. Metal to metal contact provides electrical conductivity and bonding between housing components. The aperture end 123 of the compartment is machined with an internal ledge to prevent the battery from directly transmitting force to the electronics compartment 130 if the unit is dropped. Similar battery compartments and configurations are common in standard flashlights and are known in the art.

Figure 6:
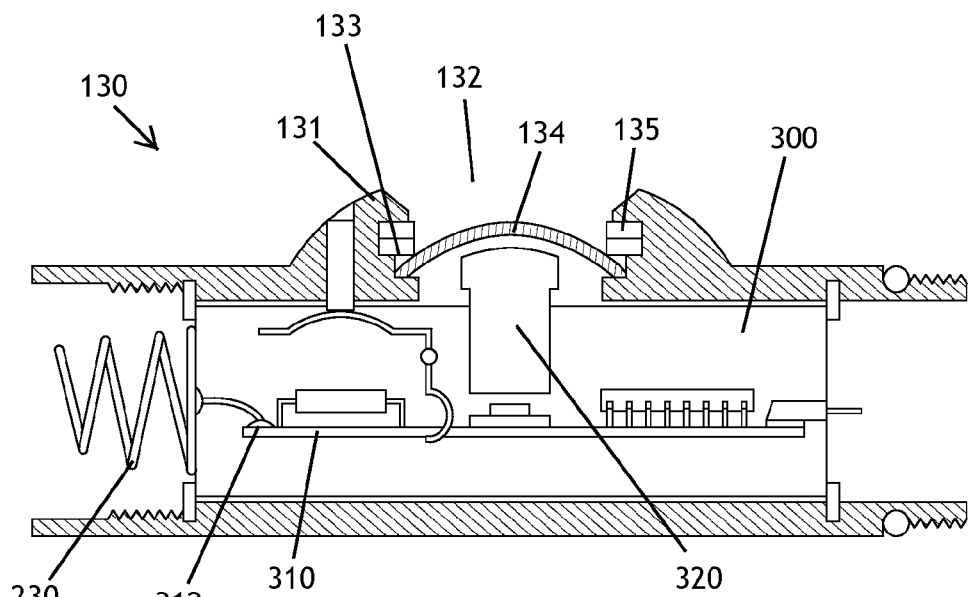
FIG. 6 is a cross section view of the electric control compartment.
Figure 7:
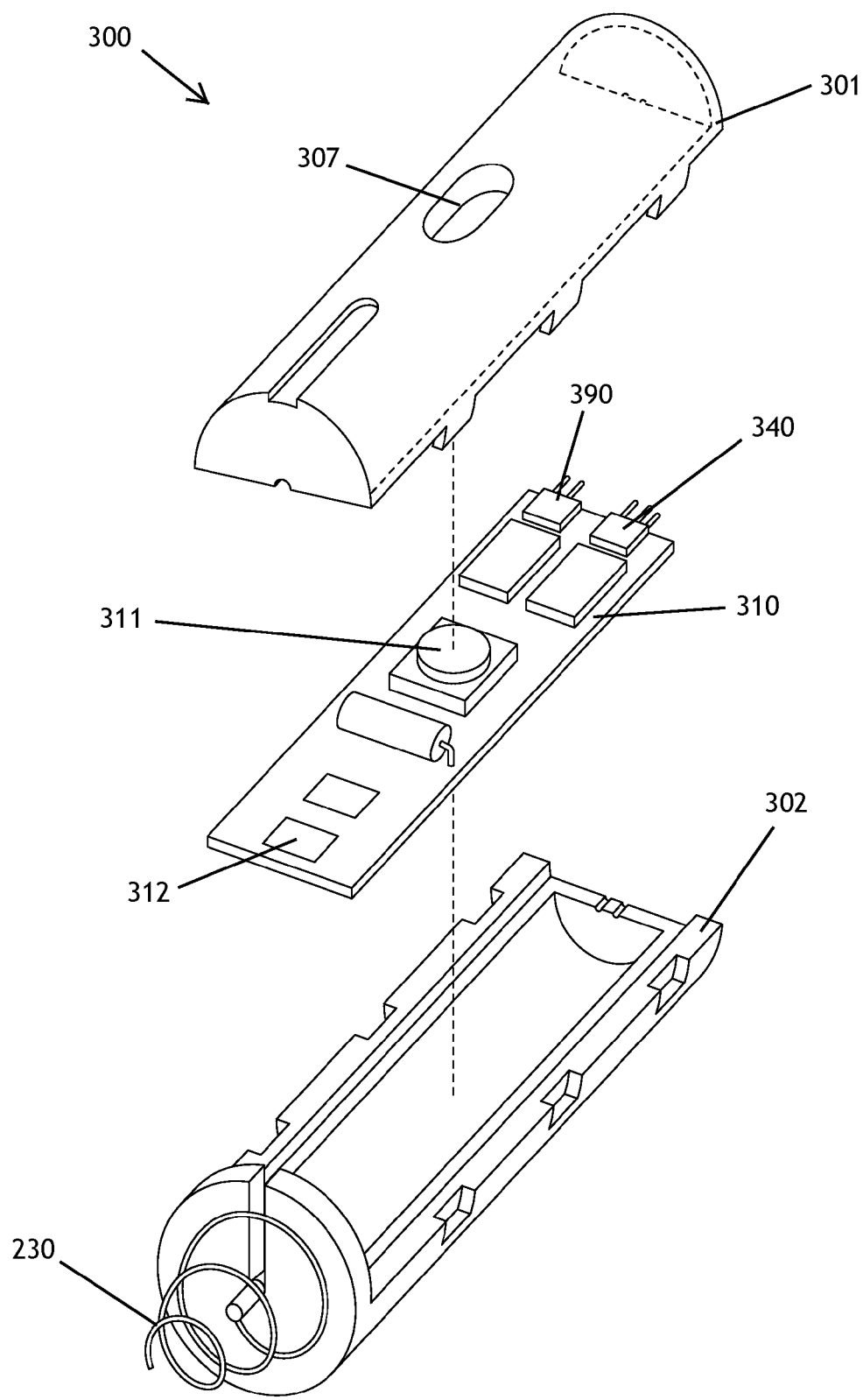
FIG. 7 is an exploded view of the electric control mechanism.

The electronics compartment 130 is shown in detail in the cross section view of FIG. 6 and the exploded view of FIG. 7. The electronics compartment 130 is anodized aluminum electronics module. It is necessary that the electronics compartment 130 always be a thermally conductive metal, such as aluminum, regardless of the composition of other components of the housing 100. The electronics compartment 130 is hollow with a raised saddle 131 having an opening 132 with a circumferential internal groove 133 sized to hold a rubberized switch cover 134 and held in place by a snap ring 135. The snap ring 135 holds the rubberized switch cover 134 in place to create a water tight seal within the opening 132. There is an electronic switch mechanism 300 sized to be housed within the electronics compartment 130. As best seen in the exploded view of FIG. 7, the electronic switch mechanism consists of a plastic carrier 305 having a carrier top 301 and a carrier bottom 302, with a circuit board 310 attached between. There is a plunger opening 307 in the carrier top 301. There is a push button switch 311 mounted on the circuit board 310. When the circuit board 310 is mounted within the plastic carrier 305, the plunger opening 307 is aligned with the push button switch 311. A plunger 320 is movably mounted within the plunger opening 307 such that it will activate the push button switch 311 when pressed. When the plastic carrier 305 is inserted within the electronics compartment 130 the plunger opening 307 is aligned with the opening 132 such that the plunger 320 sits within the opening 132 and is covered by the switch cover 134, such that the user can press the switch cover 134 to depress the plunger 320 to activate the push button switch 311. The purpose of the raised saddle 131 is to prevent inadvertent pushing of the switch cover 134 and inadvertent activation of the device. In an alternate embodiment the switch cover 134 is protected by a safety cover latch. In an alternate embodiment, shown in FIGS. 1 and 3, there is a raised latch 135, which protects the switch and switch cover 134 from inadvertent activation. In that embodiment the latch 135 must be flipped up so that the user 8 can activate the dazzler 10 by means of the witch 311.

Power from the battery 200 to the laser 400 is regulated by the electronics controller module 300 through pulse codes taken from user operation of the on-off switch 311. The electronic controller module 300 is in electronic connection with the battery 200 in the conventional manner. There is a battery spring 230 that contacts the battery 200 and transfers power to the circuit board contact 312. There is an laser connector 340 mounted on the circuit board 310, which connects to the laser lead 410 to allow power from the battery 200 to flow to the laser 400, as controlled by the controller module 300. In the preferred embodiment of the controller module 300, four modes of operation are possible: (1) off; (2) steady on; (3) periodic cyclic strobe; and (4) randomized strobe. In the preferred embodiment the periodic strobe can vary between 6 and 12 flashes per second, and in the randomized strobe the flashes will be controlled in a random manner and will flash between 6 and 16 flashes per second. Laser output is always at maximum power. Each mode will continue while the unit is powered unless changed by the user or the power source fails. There is no automatic cutoff or mode change. In continuous mode, the amp-hour capacity of the battery will enable the DPSS module to continuously deliver 1.5 hours of performance. Pulsing the laser can further disorient the target animal and will also extend the service life of the battery. The user 8 controls the mode of operation by pressing the switch cover 134, which activates the plunger 320 and in turn activates the switch 311 as follows: one press within a three second period, and the beam comes on in continuous mode and will remain in continuous mode even if the switch 311 is not again pressed; two presses within a three second period generates the periodic strobe effect; three presses within a three second period generates the randomized strobe; holding the switch 311 down for three seconds turns the unit off if the unit is on in any mode. Similar electronic control circuitry is well known in the art. The circuitry described herein is for the preferred embodiment, but other common on-off and multi-mode switches could be used.

Figure 8:
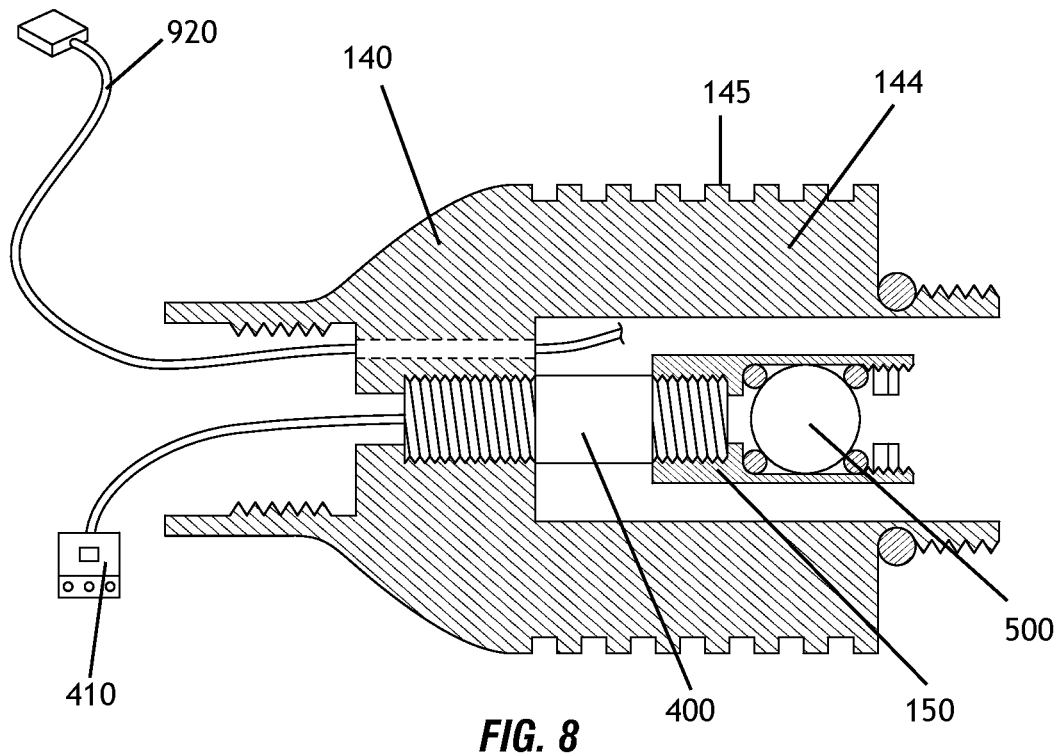
FIG. 8 is a cross section of the nose cap with the laser and lens assembly.

The nose cap 140 screws onto the electronics compartment 130 by means of appropriate corresponding threading, and is sealed by means of an appropriately sized O-ring. The nose cap 140, when secured, is flush with the electronics module compartment 130. As shown in FIG. 8, there is a Diode Pumped Solid State laser 400 mounted within the nose cap 140 by means of external threads on the laser 400 and corresponding threads in the nose cap 140. There is an electric laser lead 410 that connects to the control module 300 as described above to provide power to the laser 400. As noted, in an alternate embodiment a laser diode can be used. The laser 400 will be described in detail below. The nose cap 140 includes a thick cylindrical block of aluminum which acts as a heat sink 144. The heat sink 144 can include wraparound vanes 145 for heat dissipation. In the most preferred embodiment the diameter of the heat sink 144 is one and one half (1.5) inches, and the grooves are 3 mm deep and 2 mm wide, with 3 mm ribs created therebetween.

The lens assembly 150 is attached to the end of the laser 400. In the preferred embodiment the laser 400 has external threading, and the lens assembly has corresponding threading to allow the lens assembly 150 to screw onto the laser 400. In alternate embodiments the lens assembly 150 can be manufactured as an integral component of the laser 400. The lens assembly 150 will typically be a small cylindrical shaped structure that is co-axial with the laser 400. As seen in detail in FIGS. 9, 10 & 11, the lens assembly 150 has a lens assembly aperture 151 and a lens recess 152 sized to accommodate the diverging lens 500. The lens 500 is held into place within the lens recess 152 by means of two appropriately sized O-rings 157, one on the inside and the other on the outside of the lens 500. The lens assembly aperture 151 is positioned to allow the laser beam 410 to project into the diverging lens 500. The lens recess 152 has internal threading, and there is a lens assembly mounting ring 155 with external threading sized to screw into the internal threading of the lens recess 152 such that the mounting ring 155 is screwed into the recess and presses against the outer O-ring 157 to hold the lens 500 in place. In an alternate embodiment, shown in FIG. 11, there is a double convex lens as the diverging lens 510. In all other regards, the structure and operation of the device is the same with the double convex lens 510 instead of the ball lens 500.

The windowed aperture front cap 160 has a threaded sleeve which accepts an O-ring seal from the nose cap 140. The front cap 160 is best seen in FIGS. 2 & 3. The front cap 160 contains a centered, machined recess 161 into which a clear acrylic or glass window disc 162 is fitted and sealed into place. The external end of the front cap 160 contains a deeply machined inwardly beveled cone to protect the clear window from damage if the unit is dropped, yet makes cleaning the window easy. In an alternate embodiment the diverging lens 500 cold replace the aperture window.

There is a cold weather version of the bear dazzler 10, depicted in FIGS. 12, 13, 14, 15 & 16, which consists of a pocket unit 700 and a hand unit 800 which is operatively connected by a connecting cable 900. The cold weather version allows the bear dazzler 10 to be worn under a coat or other clothing and close to or against the user's body. Most lasers must heat up to be effective, and when worn against the body, body heat will keep the battery 200 and laser 400 operating with no cold startup latency or degraded performance. The laser beam 410 is transmitted fiber-optically to a hand held unit 800 which electrically controls the bear dazzler 10 and diverges the resulting beam of laser light 410.

Figure 15:
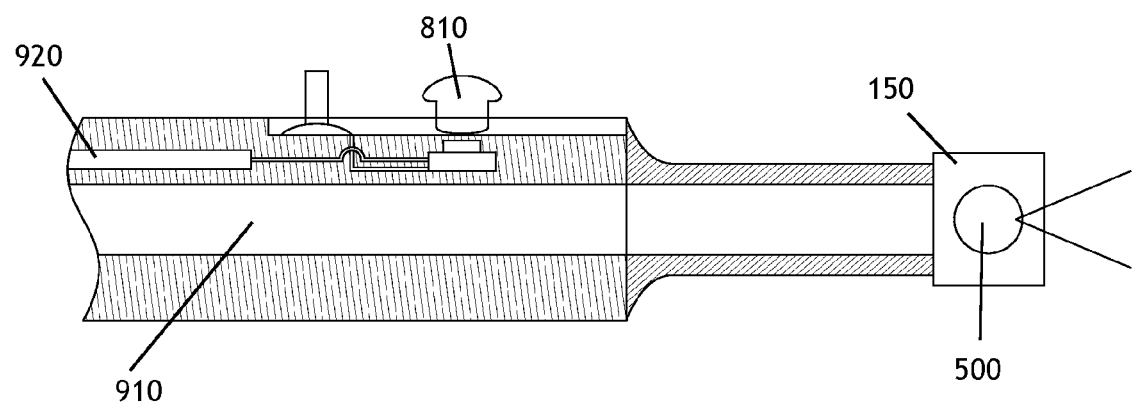
FIG. 15 is a cross section view of the laser insert of the cold weather version.
Figure 16:
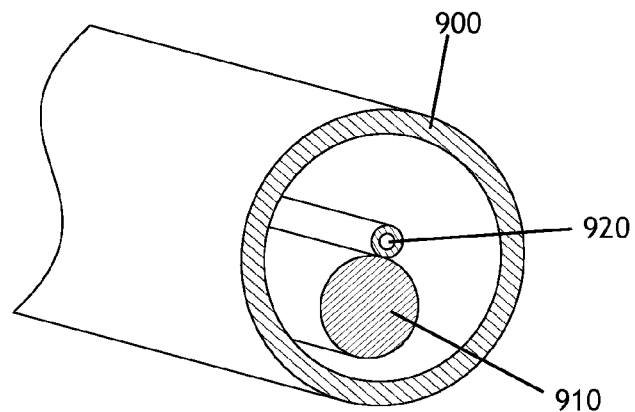
FIG. 16 is a cross section of the connection cable between the end cap and the laser insert.

The pocket unit 700 consists of the battery compartment 120, closed by the end cap 110, a modified electronics compartment 130, a modified nose cap 147 with the internal laser 400. Instead of the end cap 160, there is a transfer cap 710 which houses a fiber optic cable 910 that is aligned axially with the laser 400, such that the beam 410 will flow through the fiber optic cable 910. The flow of light through a fiber optic cable is well known. The hand unit 800 has a hand unit housing 820 that is similarly sized and shaped to resemble the housing 100 of a standard bear dazzler 10. The hand unit 800 contains a hand control switch 810 which is connected to the circuit board 310 of the control module 300 by means of an electronic control cable 920. The electronic control cable 920 is a binary wire as is common for use in similar switching mechanisms. The electronic control cable 920 attaches to the circuit board 310 at the cold weather connection point 390. The hand control switch 810 is operated in the same fashion as the main on-off switch 311 of the standard bear dazzler as described above. As best seen in FIG. 15, the lens assembly 150 is mounted at the terminus of the fiber optic cable 910 at the end of the hand unit 800. There is a conduit 900 connecting the pocket unit 700 with the hand unit 800. The conduit 900 is a tube of appropriate length, which in the preferred embodiment is about 1 meter. As seen in the perspective cut away view of FIG. 16, the conduit 900 houses the fiber optic cable 910 and the electronics control cable 920.

Figure 9:
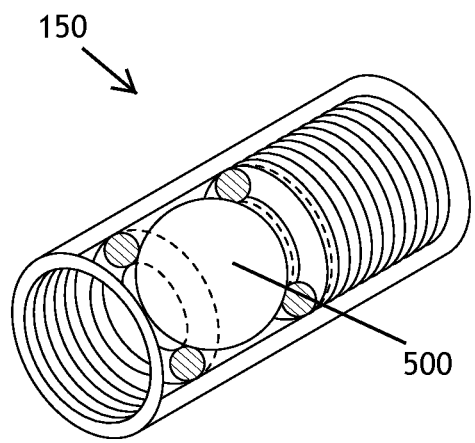
FIG. 9 is a perspective cut away of the lens assembly.
Figure 12:
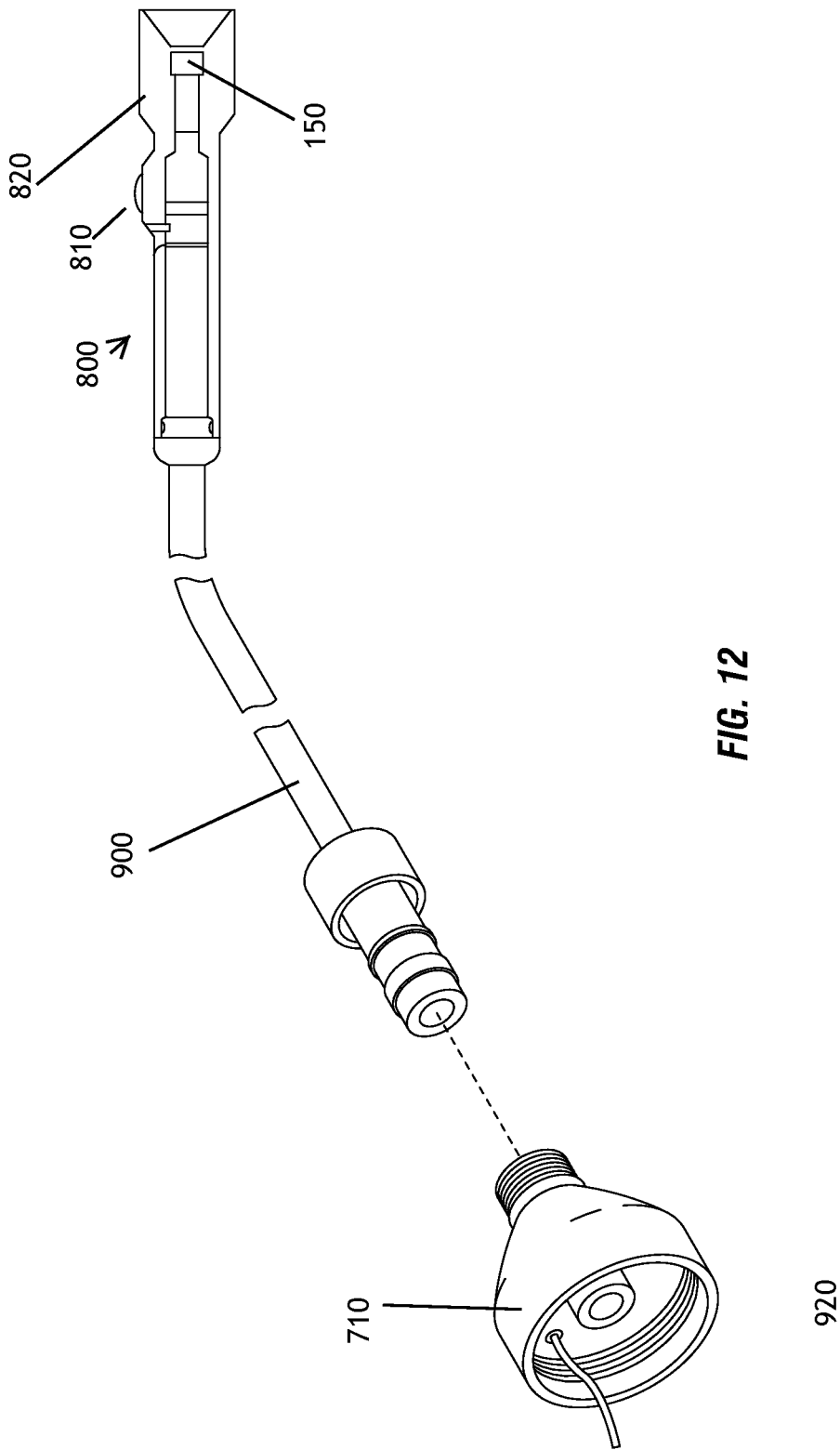
FIG. 12 is a perspective view of the cold weather version of the bear dazzler.
Figure 13:
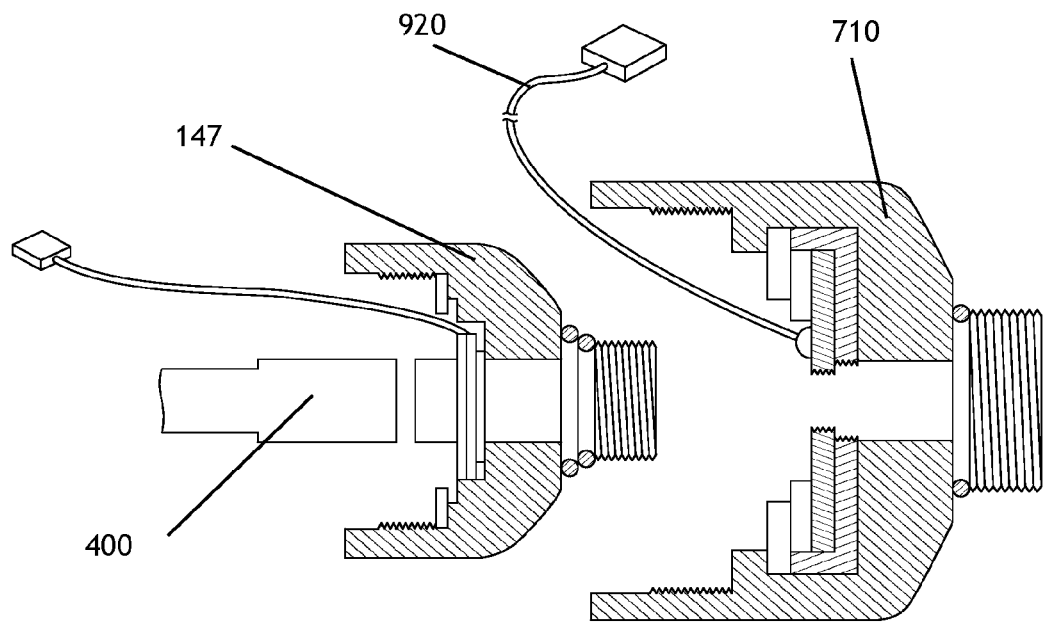
FIG. 13 is a detailed cross section of the end cap of the cold weather version.
Figure 14:
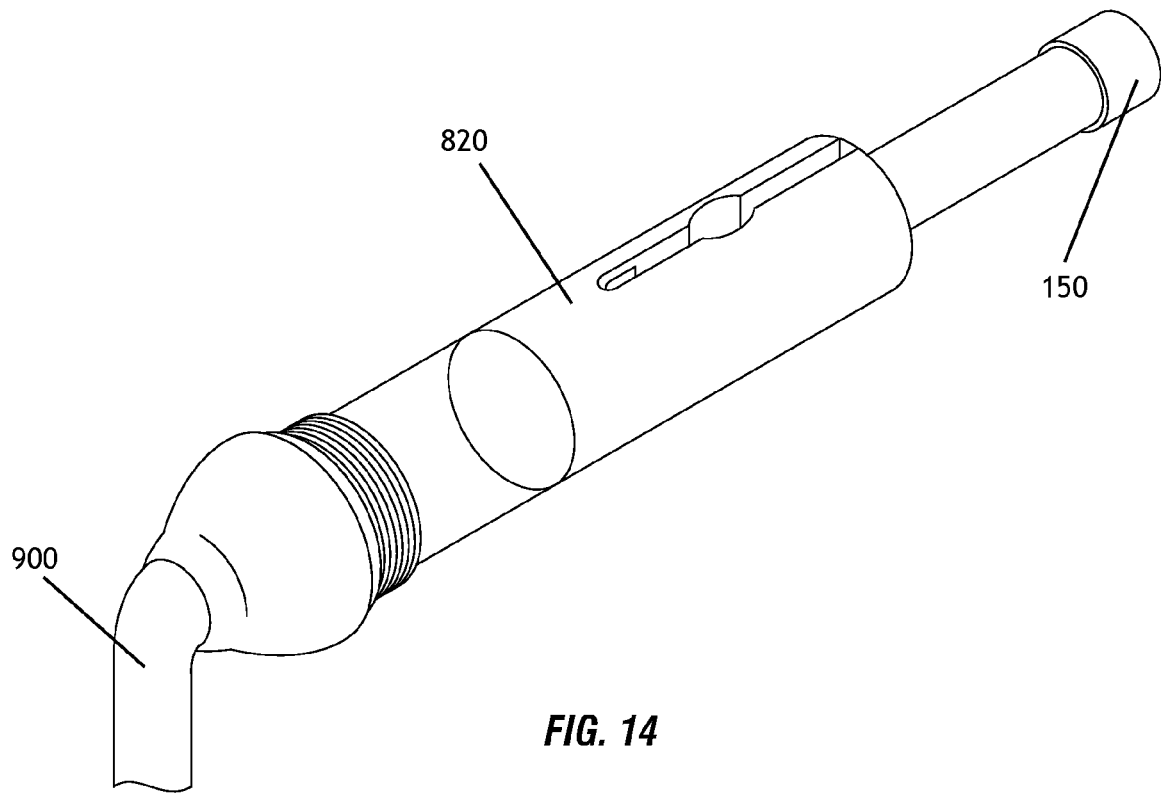
FIG. 14 is a perspective view of the laser insert of the cold weather version.

As seen in FIGS. 8 & 9, the lens assembly 150 is mounted at the end of the laser 400, and sits within the nose cap 140. In the most preferred embodiment the lens assembly 150 thread mounts to the output end of the laser 400, but could be mounted by other conventional means or could be manufactured as an integral part of the laser 400 assembly. The lens assembly holds a diverging lens 500, which in the preferred embodiment is a simple fiber-optic terminating ball lens 500. In an alternate embodiment the diverging lens could be a double convex lens 510. Either type of diverging lens provides beam divergence of between 5 to 30 degrees depending on the version of bear dazzler 10 used. In the most preferred embodiment the beam divergence is 15 degrees, and in alternate embodiments the beam divergence is between 10 and 30 degrees.

The laser 400 is an off-the-shelf Diode Pumped Solid State (DPSS) laser module commonly used for small laser devices such as astronomical or surveyor laser pointers. The laser 400 has an output wavelength of 532 nm, which appears as a lime-green in the visual spectrum and is often referred to simply as a green laser, and has a power output in the 100 to 500 mw range, as product variations demand, with a most preferred power output of 200 mw. A 555 nm wavelength would be the most preferred wavelength because it centers on the eye's most sensitive reception curve. The internal components of the DPSS laser 400, include a light emitting diode which emits light, and a collimating lens to narrow the light into a laser beam, are well known in the art and relatively standard. They are described herein for reference purposes only to help explain how the device work.

A laser beam, like every light source, will diverges from the point of emission, but it is the nature of laser beams to have a very low angle or degree of divergence. This very low angle of divergence is ideal for most standard prior art dazzlers, which require a high beam intensity at long distances. The bear dazzler 10 requires a lower intensity and is only used at a medium distances of generally less than 50 feet (or about 15 meters) and requires a much larger beam divergence angle. This allows the user to project the beam only in the general direction of a target animal without the need to aim precisely. This larger divergence, or beam spread, is accomplished by means of the diverging lens 500. There are a wide variety of diverging lenses available, but the bear dazzler uses either a ball lens, shown in FIG. 10, or a double convex lens, shown in FIG. 11. The ball lens is the most preferred option because it is easier to construct the desired apparatus and hold the ball lens 500 within the lens assembly 150.

The beam divergence angle is controlled by the focal length of the lens. For a ball lens the focal length is a factor of the diameter of the ball. As the diameter of the ball decreases the divergence angle of the beam increases. Table 1 depicts the association for beam divergence angles of between 10 and 30 degrees and the associated ball lens diameter and double convex lens focal length.

TABLE 1

| Beam Divergence Angle in Degrees | Double Convex Lens Focal Length in mm | Nominal Focal Length | Nominal Diameter | Ball Diameter in mm | Nominal Diameter |
| --- | --- | --- | --- | --- | --- |
| 10 | 9.0 | 9.0 | 6.0 | 11.2 | 10.0 |
| 15 | 6.0 | 6.0 | 6.0 | 7.5 | 8.0 |
| 20 | 4.5 | 4.5 | 4.5 | 5.6 | 6.0 |
| 25 | 3.6 | | | 4.5 | 5.0 |
| 30 | 3.0 | 3.0 | 3.0 | 3.7 | 4.0 |

The preferred embodiment uses a glass ball lens. In the most preferred embodiment the lens is an Edmund Optics N-BK7 Ball lens, made of fused silica, but other similar ball lenses would work as well. In the preferred embodiment the beam divergence angle with the most appropriate properties was between 5 and 30 degrees, with a beam divergence angle of 15 degrees as the most preferred embodiment.

The beam divergence angle controls both the intensity of the beam and the diameter of the beam at a distance from the bear dazzler. As can be appreciated, there needs to be a sufficient intensity to cause an animal to look away, as well as a large enough beam diameter at a distance to easily acquire a target animal. The dazzler effect is well known and described in a number of prior art patents. See, e.g. U.S. Pat. No. 5,685,636 to German. The dazzler produces a light beam of sufficient brightness that it is uncomfortable for the target person or animal to look at the beam. This causes the target to look away. This process is referred to in the prior art as being dazzled.

The actual intensity of a laser beam striking an object depends on the object's distance from the laser and the laser's divergence and energy profile. For a continuous wave laser of the type used in the bear dazzler, the intensity I (which is typically measured in watts/cm$^2$ or milliwatts/cm$^2$) can be calculated by dividing the power rating by the area of the beam spread, which is also called the beam footprint. For example, for an ideal laser operating continuously, having a conical divergence pattern and an even distribution of intensity throughout the beam (i.e., no "hot spots"), the intensity I is provided by the equation: $I = P/\pi(x \cdot \tan(\alpha/2))\,2$; where P is the laser power (typically measured in watts), x is the distance from the laser, and $\alpha$ is the laser beam divergence angle. For pulsed lasers, which operate with a pulse duration and frequency, the intensity is also a function of the pulse rate and energy density (typically measured in Joules) per pulse, as will be understood by those of ordinary skill in the art. Ideally, the intensity of the bear dazzler is tailored such that the maximum intensity $I_{max}$ does not exceed the Maximum Permissible Exposure (MPE) threshold, as set forth in, for example, the ANSI Z136.1-1993 guidelines, within the intended effective zone of the device. Although it is often preferred to impose the MPE limit on the present invention, it may be desirable to exceed the MPE under some circumstances, such as when the target poses a particularly high threat, or when it is highly unlikely that the target will be within the range in which the intensity levels exceed the MPE. In situations where a dangerous animal is in close proximity (depicted as Zone A in FIG. 18) the only choice to avoid injury or even death to the person will be to impose potential harm to the eye of the animal. Although this is clearly an undesirable situation, there may be cases where it is unavoidable. At 200 mw power output, the Maximum Permissible Exposure (MPE) distance is less than two meters, making this the safety zone within which the bear dazzler 10 should not be used.

The standard laser 400 uses a light of the green visible frequency, which is generally the most efficient light to produce, and it is well known in the laser arts to produce this particular type of light. This green is a highly visible color, and also a color that the human eye is both highly attuned and sensitive to. A few studies of bears have indicated that bears have similar optical physiology to humans, so it is believed that green is also be highly sensitive to bears. Field tests have been conducted with green lasers and have produced acceptable results. It is possible, and within the concept of this invention, for other types of lasers, that is other colors, to be used. While the most preferred embodiment uses green lasers, it is to be understood that other color lasers could also be used. It is possible that other animals are more sensitive to other colors, and where appropriate to the desired animal, those colors will be used.

The eye damage danger thresholds, or Maximum Permissible Exposure (MPE), are set out it Table 2a and 2b. Tables 2a & 2b set out the intensity of the light I in Watts per meter squared (W/m$^2$). The intensity is a product of the power of the beam P, the divergence angle $\alpha$, and the distance D: $I = 4\pi P/(\alpha D)^2$. The intensities in bold are over the MPE. The chart shows the intensity as a factor of the divergence angle of the beam and the distance, or range in meters, away from the beam source. As can be seen, a beam with a 5 degree spread or divergence angle can have an unacceptable intensity of just over six meters, or about twenty feet. This means that in some situations it could be possible for eye damage to occur at that range if this beam divergence angle is used. Beam divergence angles of 10 degrees and over have a much more appropriate safe range. The most preferred beam divergence angle is 15 degrees, and as can be seen in Table 2 that means there is potential eye damage at just over two meters, or approximately six feet. If a bear or wild animal is at that close proximity to a human there is an equal chance of harm to the human. The dazzler 10 is safe at any distance over 2 meters, and the degree beam divergence angle indicates that the dazzler is safe beyond two meters. Table 2a shows the intensity for distances of one to ten meters, and Table 2b, which is a continuation of the data from Table 2a, shows the intensity for distances of eleven to twenty meters. The bolded intensity numbers in Table 2a represent intensities that exceed MPE.

TABLE 2a

| Power in mW | Angle in | Range in Meters | | | | | | | | | | |
|---|---|---|---|---|---|---|---|---|---|---|---|---|
| mW | Degrees | 1 | 2 | 3 | 4 | 5 | 6 | 7 | 8 | 9 | 10 | |
| 200 | 5 | 42.08 | 10.52 | 4.68 | 2.63 | 1.68 | 1.17 | 0.86 | 0.66 | 0.52 | 0.42 | Intensity in W/m$^2$ |
| 200 | 10 | 10.52 | 2.63 | 1.17 | 0.66 | 0.42 | 0.29 | 0.21 | 0.16 | 0.13 | 0.11 | |
| 200 | 15 | 4.68 | 1.17 | 0.52 | 0.29 | 0.19 | 0.13 | 0.10 | 0.07 | 0.06 | 0.05 | |
| 200 | 20 | 2.63 | 0.66 | 0.29 | 0.16 | 0.11 | 0.07 | 0.05 | 0.04 | 0.03 | 0.03 | |
| 200 | 25 | 1.68 | 0.42 | 0.19 | 0.11 | 0.07 | 0.05 | 0.03 | 0.03 | 0.02 | 0.02 | |
| 200 | 30 | 1.17 | 0.29 | 0.13 | 0.07 | 0.05 | 0.03 | 0.02 | 0.02 | 0.01 | 0.01 | |

TABLE 2B

| Power in mW | Angle in | Range in Meters | | | | | | | | | | |
|---|---|---|---|---|---|---|---|---|---|---|---|---|
| mW | Degrees | 11 | 12 | 13 | 14 | 15 | 16 | 17 | 18 | 19 | 20 | |
| 200 | 5 | 0.35 | 0.29 | 0.25 | 0.21 | 0.19 | 0.16 | 0.15 | 0.13 | 0.12 | 0.11 | Intensity in W/m$^2$ |
| 200 | 10 | 0.09 | 0.07 | 0.06 | 0.05 | 0.05 | 0.04 | 0.04 | 0.03 | 0.03 | 0.03 | |
| 200 | 15 | 0.04 | 0.03 | 0.03 | 0.02 | 0.02 | 0.02 | 0.02 | 0.01 | 0.01 | 0.01 | |

TABLE 2B-continued

| Power in mW | Angle in | Range in Meters | | | | | | | | | |
|---|---|---|---|---|---|---|---|---|---|---|---|
| mW | Degrees | 11 | 12 | 13 | 14 | 15 | 16 | 17 | 18 | 19 | 20 |
| 200 | 20 | 0.02 | 0.02 | 0.02 | 0.01 | 0.01 | 0.01 | 0.01 | 0.01 | 0.01 | 0.01 |
| 200 | 25 | 0.01 | 0.01 | 0.01 | 0.01 | 0.01 | 0.01 | 0.01 | 0.01 | 0.00 | 0.00 |
| 200 | 30 | 0.01 | 0.01 | 0.01 | 0.01 | 0.01 | 0.00 | 0.00 | 0.00 | 0.00 | 0.00 |

Figure 17:
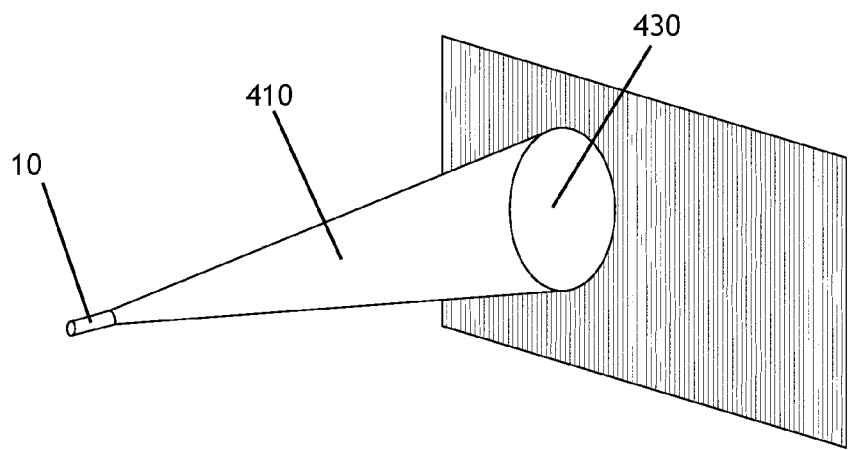
FIG. 17 is a depiction of the spread and footprint of the beam.

The degree of the beam divergence angle of the bear dazzler 10 will have a direct bearing on the maximum operable distance and effective range of the bear dazzler. This will be a product of the intensity, as described above, but also of the diameter of the beam and the ease with which the beam can be directed at and fall upon a target animal. FIG. 17 shows the patter of a typical beam of light, or of the beam 410 produced by the diverging lens 500 of the bear dazzler 10. One of the main characteristics of a laser beam is that there is generally very little beam divergence, or spread of the beam. This means that a standard laser beam can be projected to great distances without the footprint of the beam changing appreciably. The bear dazzler 10 uses a diverging lens 500, as explained above, to cause the beam 410 to spread. A beam of light will cast a light upon a surface, and the pattern that this light creates upon the surface is known as the footprint. The footprint 430 of the beam 410 of the bear dazzler 10 is a product of the divergence angle created by the lens, and the distance of the object from the dazzler 10. Table 3 shows the diameter of the footprint 430 at selected distances from the dazzler 10.

TABLE 3

| Beam Divergence Angle in Degrees | Range in Meters From Dazzler | | | | | | | | | | |
|---|---|---|---|---|---|---|---|---|---|---|---|
| | 1 | 2 | 3 | 4 | 5 | 6 | 7 | 8 | 9 | 10 | |
| 5 | 0.09 | 0.18 | 0.26 | 0.35 | 0.44 | 0.53 | 0.61 | 0.70 | 0.79 | 0.88 | Diameter |
| 10 | 0.18 | 0.35 | 0.53 | 0.70 | 0.88 | 1.05 | 1.23 | 1.40 | 1.58 | 1.75 | of |
| 15 | 0.26 | 0.53 | 0.79 | 1.05 | 1.31 | 1.58 | 1.84 | 2.10 | 2.36 | 2.63 | footprint |
| 20 | 0.35 | 0.70 | 1.05 | 1.40 | 1.75 | 2.10 | 2.45 | 2.80 | 3.15 | 3.50 | in |
| 25 | 0.44 | 0.88 | 1.31 | 1.75 | 2.19 | 2.63 | 3.06 | 3.50 | 3.94 | 4.38 | meters |
| 30 | 0.53 | 1.05 | 1.58 | 2.10 | 2.63 | 3.15 | 3.68 | 4.20 | 4.73 | 5.25 | |

Typically the maximum effective distance is approximately 10 meters or about thirty feet. With a lens having a ten degree divergence or beam spread the beam footprint 430 will be 1.75 meters in diameter, or about five feet wide, at ten meters from the dazzler 10. This should be sufficient to fairly easily aim the bear dazzler to ensure that the beam will shine upon the face and into the eyes of the bear or other target animal. Most animals have eyes that are less than one foot apart. Bears and most predators, like wolves or large cats, have eyes that face forward, giving the animal binocular vision. When the animal is facing the dazzler 10 it will appear as a single dot of light. Other large and potentially dangerous animals, such as bison or moose in North America, have eyes positioned on the side of the head. In either case the width of the beam will be sufficient to fall upon both eyes of an animal in the target range, and the intensity will be sufficient to cause eye irritation and to induce the animal to turn look away from the light. When most animals look away from an object they also turn away, so the result is that when the bear dazzler causes eye irritation the animal will turn away.

With a beam divergence of 30 degrees, the beam footprint 430 will be 5.25 meters or about 17 feet wide at 30 feet (10 meters) distance from the dazzler 10. This means that it will be significantly easier to aim the dazzler with a 30 degree beam divergence angle. But because the intensity will be lower with a higher beam divergence angle this means that the effective range will be comparably shorter. A larger divergence angle makes the dazzler easier to aim but decreases the effective range. Conversely, a lower beam divergence angle increases the operable deterrent distance of the dazzler, but it makes the dazzler slightly harder to aim. There is a trade-off between effective range and ease of aim. As a result the beam divergence angle of 15 degrees in most preferable.

The beam divergence angle allows the user to be able to only have to point the dazzler in the general direction of the animal to be effective and to hit both eyes. With a standard, non-diverged laser beam it would be necessary to precisely point the laser into the animal's eye, and it would be possible to only hit one eye at a time at an operable distance. Standard dazzlers have a small beam spread with a desired useful distance of hundreds, if not thousands of feet, and so would hit both eyes of a bi-focal animal (like a human or a bear) at between (hundreds and thousands of feet), which would be well beyond the operable range necessary for a hiker encountering a bear. The optimal range of the bear dazzler is between ten and twenty yards. It is desirable to keep the bear at least ten yards, or about thirty feet, away.

Figure 18:
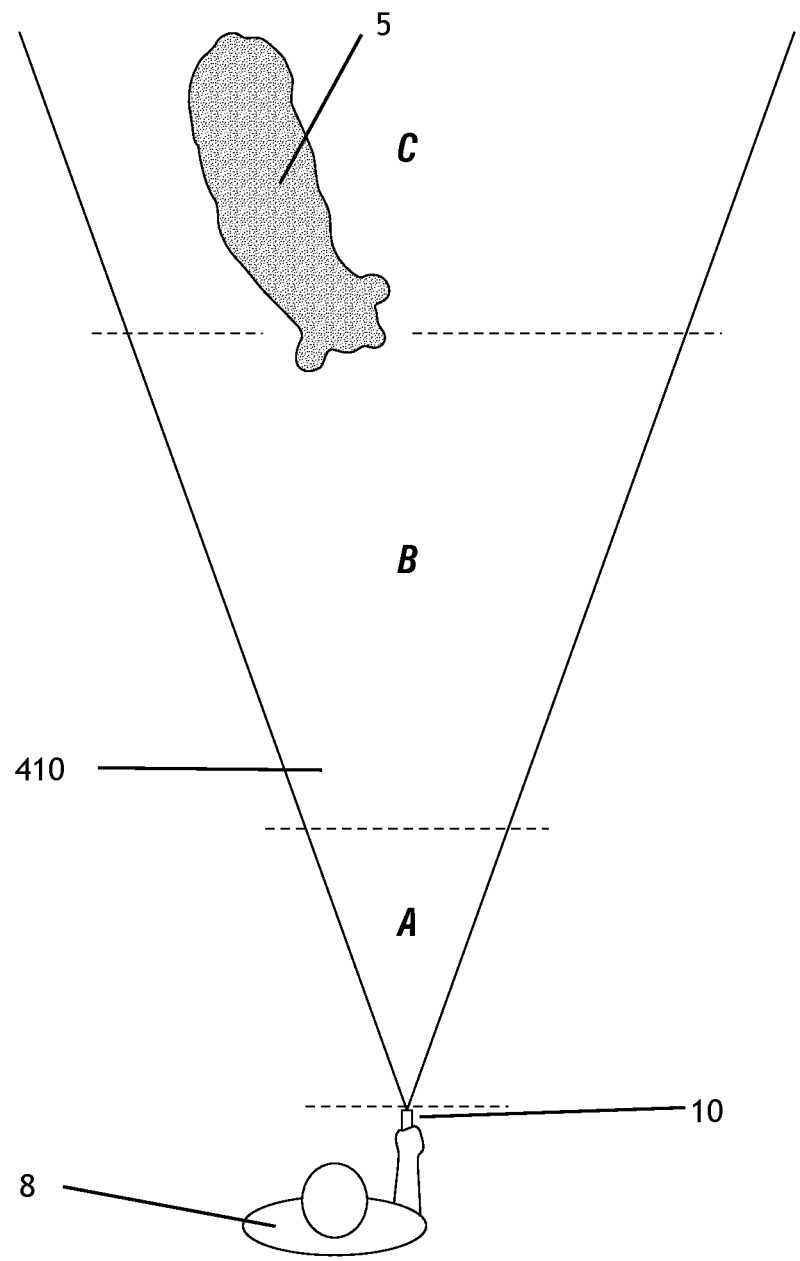
FIG. 18 is a depiction of the effective range and beam spread of the bear dazzler.

The method of use of the bear dazzler 10 is depicted in FIG. 18. The bear dazzler 10 produces a laser light in a diverged beam 410 that has sufficient intensity to temporarily disorient and unsettle a bear 8 (or other target animal) by depriving it of effective sight, much like the effect of looking into a photo flash. When the user 8 encounters a situation where a bear 5 approaches or the user 8 wishes to move a bear 5 out of an area, the light beam 410 from bear dazzler 10 is aimed at the bear's head and face. Even if bright sunlight prevents the user 8 from seeing the beam 410, the beam 410 should be generally aimed in the appropriate direction of the bear 5. The breadth of the beam 410 will adequately cover the target area even if the bear dazzler 10 is not precisely aimed. This is important since it will often be difficult to precisely aim in a stressful situation such as an encounter with a potentially dangerous animal. As the bear 5 draws nearer to the bear dazzler 10, the beam becomes increasingly intense, as defined by the inverse square law of light, as defined above. At the point where the bear 5 loses compelling visual acquisition, it will turn away. If the bear 5 makes additional approaches, repeat the application as necessary, until the animal tires and departs.

The bear dazzler 10 can be used in conjunction with other techniques such as silence, standing still, advancing while the bear 5 is dazzled, individuals grouping together to appear larger and/or employing body movements and noise or yelling to appear more formidable. The temperament of the bear 5 and circumstances of the encounter will determine the correct approach.

The diagram of FIG. 18, depicts the user 8 standing at the bottom of the figure, and projects the bear dazzler beam 410 at the approaching bear 5. There are three defined zones: Zone A is the Maximum Permissible Exposure (MPE) safety zone. If the bear 5 is within zone A, a prolonged gaze into the bear dazzler 10 could result in permanent injury to the retina of the animal. Specifically the light can create a permanent dark spot in the field of vision. The MPE threshold distance from the bear dazzler 10 is under 2 meters or 6.7 feet, depending on the beam divergence angle. Zone B is the effective zone. An animal 5 in this zone is disoriented and thwarted from further approach. Zone C is the detection zone. It extends from the Zone B effectiveness threshold to an indefinite distance. An animal 5 in this zone will detect the Bear Dazzler but will not be appreciably affected by it. The dazzler will appear to the animal as a point of light, but not produce a beam 410 of sufficiently intensity to cause the animal to turn away. Preliminary field tests indicate that the effective range of the bear dazzler 10 is approximately 10 meters, or thirty feet using a 15 degree beam divergence.

The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are exemplary only, and are not exhaustive of the scope of the invention. Consequently, the present invention is intended to be limited only be the spirit and scope of the claims, giving full cognizance to equivalents in all respects.

I claim:

1. A device for deterring a wild animal attack comprising:
   a standard DPSS laser having an internal collimating lens that produces a laser beam;
   a power source for said standard DPSS laser;
   an electrical controlling mechanism for said standard DPSS laser
   a diverging lens to create a beam spread of between 5 and 30 degrees to easily engage an animal and with sufficient intensity to deter the animal at a safe distance.

2. The device for deterring a wild animal attach of claim 1, wherein a user can deter a wild animal attack by pointing said device such that the beam spread will shine said laser beam into said animal's eyes such that said animal will loose visual acuity and will turn away from said laser beam light source and hence away from said user.

3. The device for deterring a wild animal attack of claim 1 wherein the safe distance is between six and fifty feet.

4. The device for deterring a wild animal attack of claim 1 wherein the safe distance is approximately thirty feet.

5. The device for deterring a wild animal attack of claim 1 wherein said beam spread is 15 degrees.

6. The device for deterring a wild animal attack of claim 1 further comprising:
   a housing configured to hold said standard DPSS laser, said power source and said electrical controlling mechanism, wherein said housing is sized for easy carrying and use.

7. The device for deterring a wild animal attack of claim 1 wherein said electrical controlling mechanism has at least four modes consisting of;
   a first off mode;
   a second steady on mode;
   a third consistently strobing mode; and
   a fourth randomly strobing mode.

8. A device for deterring a wild animal attack comprising:
   a standard DPSS laser having an internal collimating lens that produces a laser beam;
   a power source for said standard DPSS laser;
   an electrical controlling mechanism for said standard DPSS laser
   a diverging lens to create a beam spread of between 5 and 30 degrees to easily engage an animal and with sufficient intensity to deter the animal at a safe distance
   a pocket unit housing said power source and said laser
   a hand unit housing said electronic controlling mechanism and said diverging lens;
   a connecting conduit containing a fiber optic cable connecting said laser to said diverging lens, and an electronic controlling cable connecting said electronic controlling mechanism to said power source;
   wherein a user of the device can keep the pocket unit in an article of clothing and control the device through use of the hand unit.

9. The device for deterring a wild animal attack of claim 8, wherein a user can deter a wild animal attack by pointing said device such that the beam spread will shine said laser beam into said animal's eyes such that said animal will loose visual acuity and will turn away from said laser beam light source and hence away from said user.

10. The device for deterring a wild animal attack of claim 8 wherein the safe distance is between six and fifty feet.

11. The device for deterring a wild animal attack of claim 8 wherein the safe distance is approximately thirty feet.

12. The device for deterring a wild animal attack of claim 8 wherein said beam spread is 15 degrees.

13. The device for deterring a wild animal attack of claim 8 wherein said electrical controlling mechanism has at least four modes consisting of;
    a first off mode;
    a second steady on mode;
    a third consistently strobing mode; and
    a fourth randomly strobing mode.

14. A method for deterring a wild animal attack comprising the steps of;
    providing a standard DPSS laser having an internal collimating lens, said laser further having an incorporated power source and controlling mechanisms;
    disposing a diverging lens at the operable end of said standard DPSS laser;
    detecting an approaching animal;
    activating said laser by means of said controlling mechanism to produce a beam such that said diverging lens diverges said beam between 5 and 30 degrees;
    pointing said laser in the direction of said animal such that said animal is within said beam;
    wherein the beam of said laser irritates the animal's eyes such that the animal turns away from said laser.

15. The method for deterring a wild animal attack of claim 14, wherein said diverged beam has an effective range of between 25 to 50 feet.

16. The method for deterring a wild animal attack of claim 14 consisting of the additional steps of providing a 15 degree diverging lens.

17. The method for deterring a wild animal attack of claim 14 consisting of the additional steps of;
   providing a housing;
   disposing within said housing an internal battery compartment, an electronic compartment, and a laser mounted therein;
   wherein said battery compartment is sized to accommodate a battery power source;
   wherein said electronics compartment incorporates a multi-mode switch in electronic cooperation with said battery; and
   wherein said laser is in electronic cooperation with said multi-mode switch such that said multi-mode switch controls the operation of said laser.

18. The method for deterring a wild animal attack of claim 17, wherein said multi-mode switch has four adjustable settings of;
   a first setting of off;
   a second setting of on, which is activated by a single click of the switch;
   a third setting with a uniform strobe, which is activated by two clicks of the switch; and
   a fourth setting with a random strobe, which is activated by three quick clicks of the switch; and wherein further said multi-mode switch can be returned to the off setting by depressing and holding said switch.

\* \* \* \* \*